US012643588B2

(12) United States Patent
Zhong

(10) Patent No.: US 12,643,588 B2
(45) Date of Patent: Jun. 2, 2026

(54) TRANSPORTATION DEVICE

(71) Applicant: Wonderland Switzerland AG, Steinhausen (CH)

(72) Inventor: Zhiren Zhong, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 178 days.

(21) Appl. No.: 18/263,735

(22) PCT Filed: Feb. 8, 2022

(86) PCT No.: PCT/EP2022/053019
§ 371 (c)(1),
(2) Date: Aug. 1, 2023

(87) PCT Pub. No.: WO2022/167687
PCT Pub. Date: Aug. 11, 2022

(65) Prior Publication Data
US 2024/0092412 A1 Mar. 21, 2024

(30) Foreign Application Priority Data

Feb. 8, 2021 (CN) .......................... 202110171105.3

(51) Int. Cl.
*B62B 7/08* (2006.01)
*B62B 7/06* (2006.01)
*B62B 9/10* (2006.01)

(52) U.S. Cl.
CPC .............. *B62B 7/083* (2013.01); *B62B 7/062* (2013.01); *B62B 7/064* (2013.01); *B62B 9/104* (2013.01)

(58) Field of Classification Search
CPC .. B62B 7/083; B62B 7/08; B62B 7/06; B62B 7/04; B62B 7/062; B62B 7/064; B62B 9/104; B62B 9/102; B62B 9/10
See application file for complete search history.

(56) References Cited

U.S. PATENT DOCUMENTS 5,257,799 A * 11/1993 Cone .......................... B62B 9/26
280/47.36
7,900,952 B2 3/2011 Cone, II
(Continued)

FOREIGN PATENT DOCUMENTS

CN 101722978 A 6/2010
CN 104859700 A 8/2015
(Continued)

OTHER PUBLICATIONS

Taiwanese Application No. 113118179; Office Action dated Aug. 6, 2024; 7 pages.
(Continued)

*Primary Examiner* — John D Walters
(74) *Attorney, Agent, or Firm* — CANTOR COLBURN LLP

(57) ABSTRACT

A transportation device includes a handle, a rear leg, a front leg, a seat, a fixing member, a first seat linkage member and a second seat linkage member. The front leg is pivotally connected to the rear leg. The seat is pivotally connected to the front leg. The fixing member is disposed at a rear side of the seat and connected to an end of the handle. The first seat linkage member is pivotally connected to the seat and the fixing member. The second seat linkage member is pivotally connected to the seat and the rear leg. When the handle, the rear leg and the front leg are folded with respect to each other, the fixing member and the rear leg drive the rear side of the seat to rotate toward a direction opposite to the ground by the first seat linkage member and the second seat linkage member respectively.

18 Claims, 16 Drawing Sheets

(56) References Cited

U.S. PATENT DOCUMENTS

| | | | | |
|---|---|---|---|---|
| 8,602,442 | B2 * | 12/2013 | Li | ............................ B62B 7/062 |
| | | | | 280/647 |
| 8,936,267 | B2 | 1/2015 | Li et al. | |
| 8,991,853 | B2 | 3/2015 | Li et al. | |
| 9,346,479 | B1 * | 5/2016 | Ransil | ...................... B62B 7/064 |
| 9,796,404 | B2 * | 10/2017 | Xu | ............................ B62B 7/08 |
| 11,247,711 | B2 * | 2/2022 | Kwok | ...................... B62B 9/102 |
| 2011/0304124 | A1 | 12/2011 | Chen et al. | |
| 2017/0050660 | A1 | 2/2017 | Xu | |
| 2017/0144687 | A1 | 5/2017 | Li et al. | |
| 2018/0134306 | A1 | 5/2018 | Chen | |

FOREIGN PATENT DOCUMENTS

| | | |
|---|---|---|
| CN | 105216847 A | 1/2016 |
| CN | 206265119 U | 6/2017 |
| CN | 107757689 A | 3/2018 |
| CN | 106741091 B | 4/2019 |
| CN | 111376963 A | 7/2020 |
| CN | 211196325 U | 8/2020 |
| CN | 112061220 A | 12/2020 |
| CN | 212220349 U | 12/2020 |
| CN | 112238889 A | 1/2021 |
| CN | 212401332 U | 1/2021 |
| CN | 212401334 U | 1/2021 |
| EP | 2001723 A1 | 12/2008 |
| GB | 2408489 A | 6/2005 |
| JP | 2015120516 A | 7/2015 |
| JP | 2016199173 A | 12/2016 |
| JP | 2017144856 A | 8/2017 |
| JP | 2018008697 A | 1/2018 |
| JP | 2020019355 A | 2/2020 |
| TW | 201311489 A | 3/2013 |
| TW | 201817625 A | 5/2018 |
| WO | 2008054852 A1 | 5/2008 |

OTHER PUBLICATIONS

International Search Report and Written Opinion for International Application No. PCT/EP2022/053019; International Filing Date: Feb. 8, 2022; Date of Mailing: Jun. 29, 2022; 17 pages.

Chinese Application No. 202110171105.3; Office Action with English translation dated Dec. 25, 2024; 12 pages.

AU Examination Report 1; AU Appl No. 2025200135; Date Mailed: Nov. 26, 2025; pp. 1-4.

JP Office Action with English Translation; JP Appl No. 2024-197932; Mail Date Dec. 9, 2025; pp. 1-12.

EP Communication; Extended European Search Report; Application No. 25191638.3-1009/4613610; Date Mailed: Nov. 4, 2025; pp. 1-8.

Chinese Application No. 202110171105.3; Office Action with English translation dated Jun. 28, 2024; 30 pages.

Japanese Application No. 2023-529960; Office Action with English translation dated May 7, 2024; 10 pages.

CN Notice of Allowance with English Translation; App No. 202110171105.3; Date Mailed Mar. 2, 2026; pp. 1-5.

IN Office Action with English Translation; Appl No. 202317056539; Date Mailed: Mar. 30, 2026; pp. 1-8.

* cited by examiner

TRANSPORTATION DEVICE

CROSS REFERENCE TO RELATED APPLICATIONS

This application is a National Stage Application of PCT/EP2022/053019, filed Feb. 8, 2022, which claims the benefit of Chinese Application No. 202110171105.3, filed on Feb. 8, 2021, both of which are incorporated herein by reference in their entirety.

FIELD OF THE INVENTION

The present invention relates to a transportation device, particularly a transportation device capable of preventing a backrest from affecting the folding of the transportation device.

BACKGROUND OF THE INVENTION

A stroller is a tool used by parents to carry babies or children when they go shopping. At present, there are various foldable strollers to facilitate storage or transportation. Referring to FIGS. 1 and 2, FIG. 1 is a side view illustrating a stroller 1 of the prior art and FIG. 2 is a side view illustrating the stroller 1 shown in FIG. 1 being folded. As shown in FIGS. 1 and 2, the stroller 1 includes a handle 10, a rear leg 12, a front leg 14, a seat 16, a handrail 18 and a backrest 20. The handle 10, the rear leg 12 and the front leg 14 can be folded or unfolded with respect to each other to drive the seat 16, the handrail 18 and the backrest 20 to be folded or unfolded. As shown in FIG. 2, when the handle 10, the rear leg 12 and the front leg 14 are folded with respect to each other, the seat 16 and the handrail 18 both rotate upward and the backrest 20 rotate downward. If the backrest 20 is too long, the backrest 20 will touch the ground after the stroller 1 is folded. The backrest 20 not only affects the folding of the stroller 1 but also is easy to get dirty, such that the length of the backrest 20 is limited. Furthermore, the seat 16 and the handrail 18, which rotate upward, will increase the length of the folded stroller 1. Thus, it is not beneficial for storing or transporting the stroller 1.

SUMMARY OF THE INVENTION

The present invention aims at providing a transportation device capable of preventing a backrest from affecting the folding of the transportation device, thereby resolving the aforesaid problems.

This is achieved by a transportation device according to claims 1 and 9. The dependent claims pertain to corresponding further developments and improvements.

As will be seen more clearly from the detailed description following below, the claimed transportation device includes a handle, a rear leg, a front leg, a seat, a fixing member, a first seat linkage member and a second seat linkage member. The front leg is pivotally connected to the rear leg. The seat is pivotally connected to the front leg. The fixing member is disposed at a rear side of the seat and connected to an end of the handle. The first seat linkage member is pivotally connected to the seat and the fixing member. The second seat linkage member is pivotally connected to the seat and the rear leg. When the handle, the rear leg and the front leg are folded with respect to each other, the fixing member and the rear leg drive the rear side of the seat to rotate toward a direction opposite to ground by the first seat linkage member and the second seat linkage member respectively. When the handle, the rear leg and the front leg are unfolded with respect to each other, the fixing member and the rear leg drive the rear side of the seat to be positioned toward ground by the first seat linkage member and the second seat linkage member respectively.

Preferably, after the seat is folded, a front side of the seat is lower than the rear side of the seat.

Preferably, the transportation device further includes a lower leg rest pivotally connected to the front side of the seat.

Preferably, the transportation device further includes a handrail pivotally connected to the handle.

Preferably, the transportation device further includes a first handrail linkage member and a second handrail linkage member. The first handrail linkage member is pivotally connected to the handrail and the second handrail linkage member. The second handrail linkage member is fixed on the rear leg. When the handle, the rear leg and the front leg are folded or unfolded with respect to each other, the rear leg drives the handrail to be folded or unfolded by the first handrail linkage member and the second handrail linkage member.

Preferably, the transportation device further includes a first handrail linkage member. The first handrail linkage member is pivotally connected to the handrail and the rear leg. When the handle, the rear leg and the front leg are folded or unfolded with respect to each other, the rear leg drives the handrail to be folded or unfolded by the first handrail linkage member.

Preferably, the transportation device further includes a backrest and a backrest rotating base. The backrest is pivotally connected to the backrest rotating base.

Preferably, the transportation device further includes a first backrest linkage member and a second backrest linkage member. The first backrest linkage member is pivotally connected to the backrest rotating base and the handle. The second backrest linkage member is pivotally connected to the fixing member, the seat and the backrest rotating base. When the handle, the rear leg and the front leg are folded or unfolded with respect to each other, the handle drives the backrest to be folded or unfolded by the first backrest linkage member and the second backrest linkage member.

As will be seen more clearly from the detailed description following below, the claimed transportation device includes a handle, a rear leg, a front leg and a seat. The front leg is pivotally connected to the rear leg. The seat is pivotally connected to the handle, the rear leg and the front leg. The handle, the rear leg and the front leg are folded or unfolded with respect to each other to drive the seat to be folded or unfolded. After the seat is folded, a front side of the seat is lower than a rear side of the seat.

Preferably, the transportation device further includes a fixing member, a first seat linkage member and a second seat linkage member. The fixing member is disposed at the rear side of the seat and connected to an end of the handle. The first seat linkage member is pivotally connected to the seat and the fixing member, such that the seat is pivotally connected to the handle. The second seat linkage member is pivotally connected to the seat and the rear leg, such that the seat is pivotally connected to the rear leg. When the handle, the rear leg and the front leg are folded with respect to each other, the fixing member and the rear leg drive the rear side of the seat to rotate toward a direction opposite to ground by the first seat linkage member and the second seat linkage member respectively. When the handle, the rear leg and the front leg are unfolded with respect to each other, the fixing member and the rear leg drive the rear side of the seat to be positioned toward ground by the first seat linkage member and the second seat linkage member respectively.

Preferably, the transportation device further includes a lower leg rest pivotally connected to the front side of the seat.

Preferably, the transportation device further includes a handrail pivotally connected to the handle.

Preferably, the transportation device further includes a first handrail linkage member and a second handrail linkage member. The first handrail linkage member is pivotally connected to the handrail and the second handrail linkage member. The second handrail linkage member is fixed on the rear leg. When the handle, the rear leg and the front leg are folded or unfolded with respect to each other, the rear leg drives the handrail to be folded or unfolded by the first handrail linkage member and the second handrail linkage member.

Preferably, the transportation device further includes a first handrail linkage member. The first handrail linkage member is pivotally connected to the handrail and the rear leg. When the handle, the rear leg and the front leg are folded or unfolded with respect to each other, the rear leg drives the handrail to be folded or unfolded by the first handrail linkage member.

Preferably, the transportation device further includes a backrest and a backrest rotating base. The backrest is pivotally connected to the backrest rotating base.

Preferably, the transportation device further includes a first backrest linkage member and a second backrest linkage member. The first backrest linkage member is pivotally connected to the backrest rotating base and the handle. The second backrest linkage member is pivotally connected to the fixing member, the seat and the backrest rotating base. When the handle, the rear leg and the front leg are folded or unfolded with respect to each other, the handle drives the backrest to be folded or unfolded by the first backrest linkage member and the second backrest linkage member.

When the transportation device of the invention is folded, the invention utilizes the first seat linkage member and the second seat linkage member to drive the rear side of the seat to rotate toward a direction opposite to the ground, such that the front side of the seat is lower than the rear side of the seat. In general, the rear side of the seat is the boundary between the seat and the backrest. Therefore, after the transportation device of the invention is folded, the boundary between the seat and the backrest will move to the most top position, such that the backrest will not touch the ground after the transportation device is folded. Thus, the length of the backrest may increase according to practical requirements. Furthermore, after the transportation device of the invention is folded, the seat and the handrail both rotate downward, so as to reduce the height of the folded transportation device. Accordingly, it is beneficial for storing or transporting the transportation device.

BRIEF DESCRIPTION OF THE DRAWINGS

In the following, the invention is further illustrated by way of example, taking reference to the accompanying drawings thereof.

DETAILED DESCRIPTION

Figure 1:
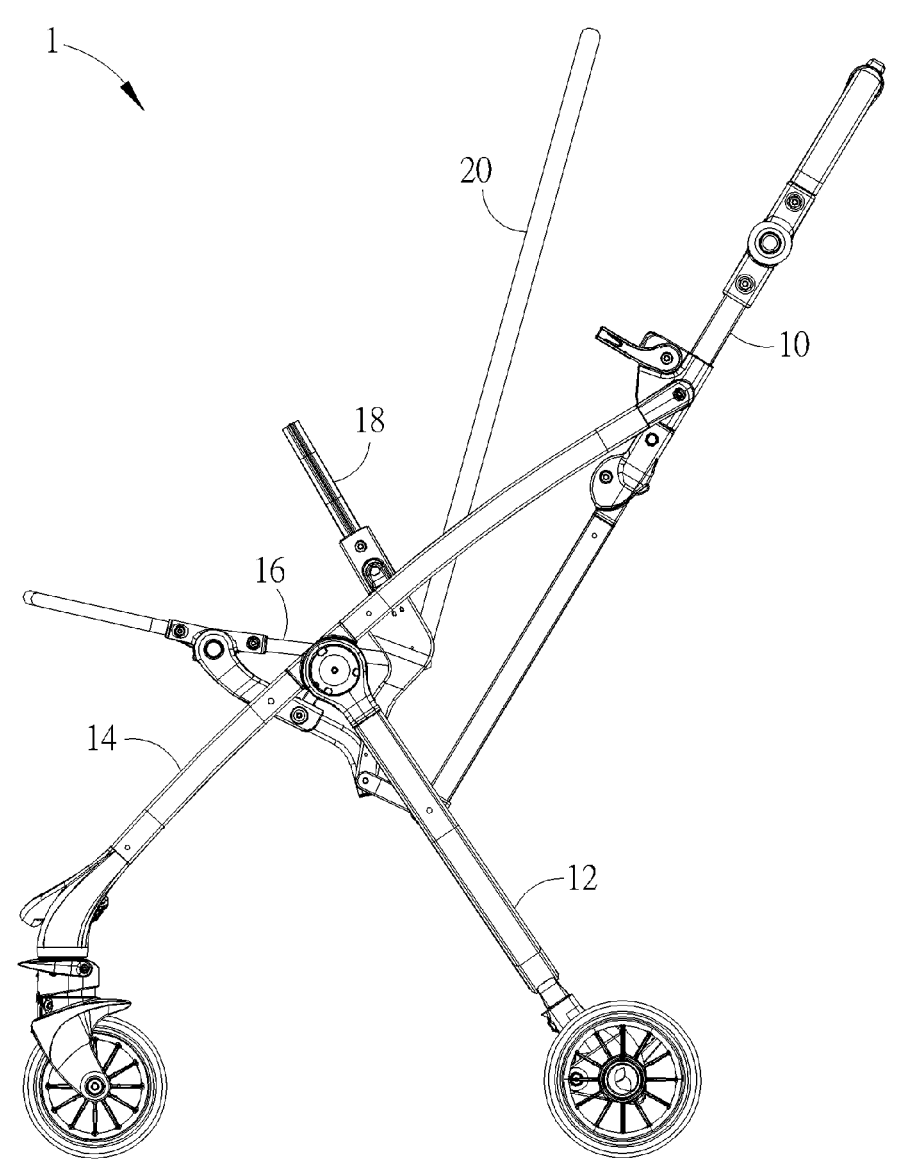
FIG. 1 is a side view illustrating a stroller of the prior art.
Figure 2:
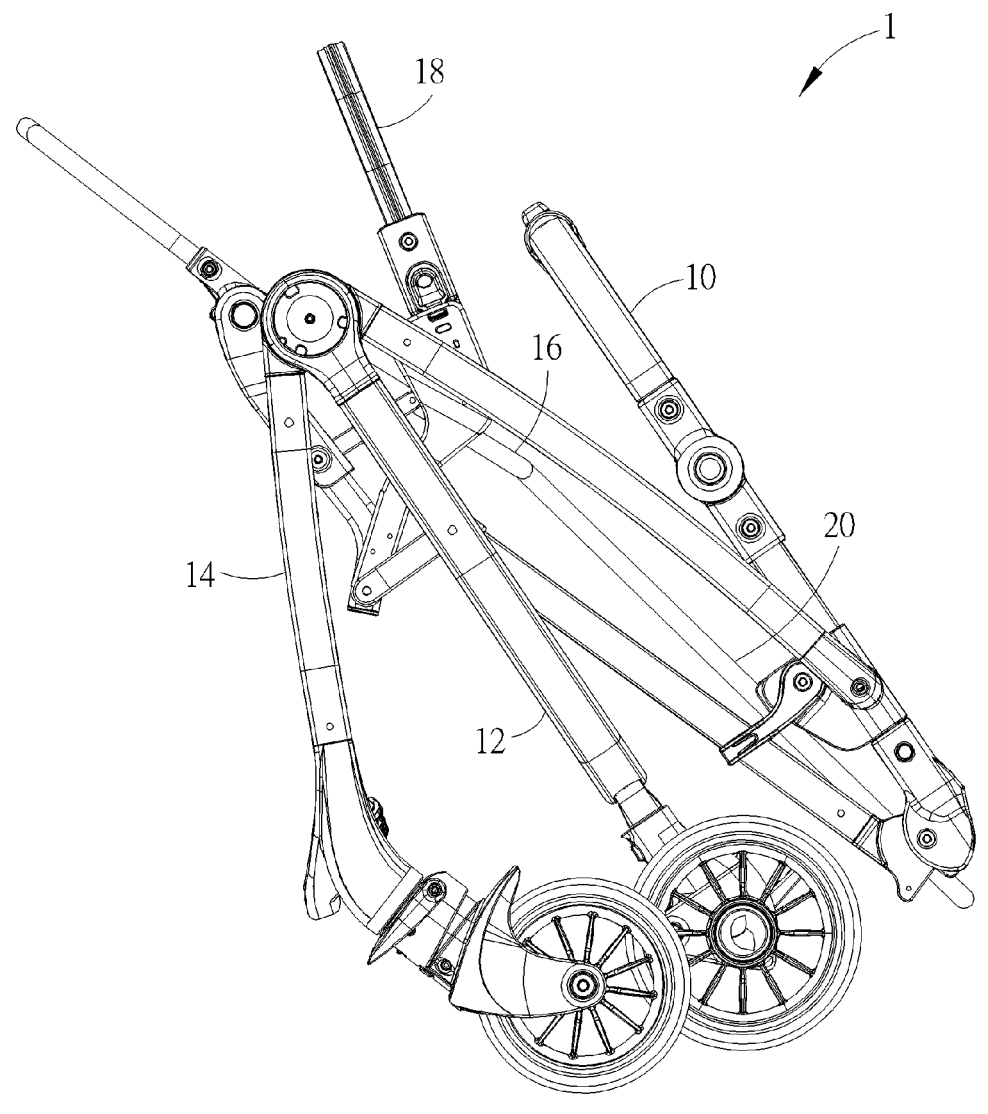
FIG. 2 is a side view illustrating the stroller shown in FIG. 1 being folded.
Figure 3:
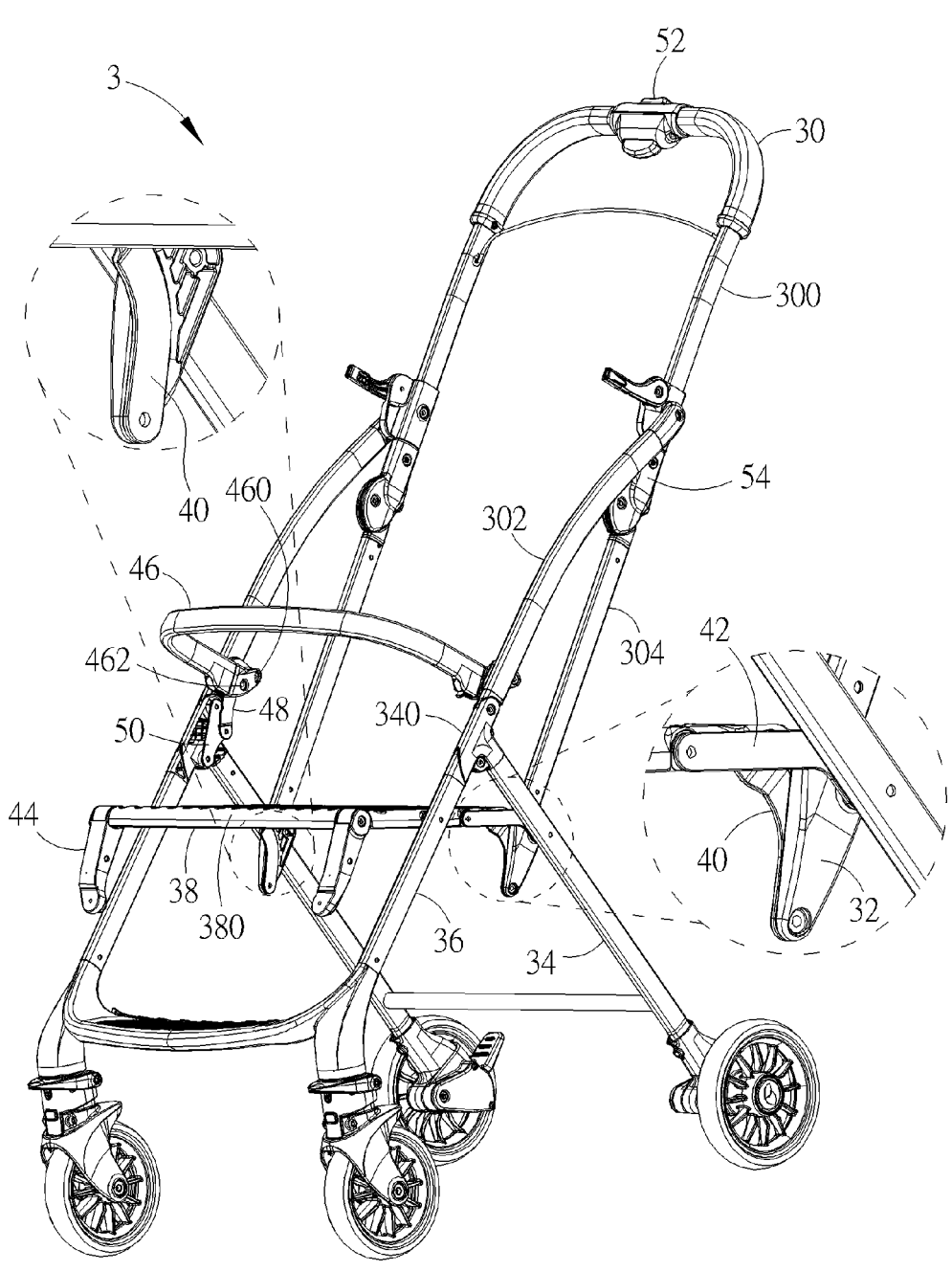
FIG. 3 is a perspective view illustrating a transportation device according to an embodiment of the invention.
Figure 4:
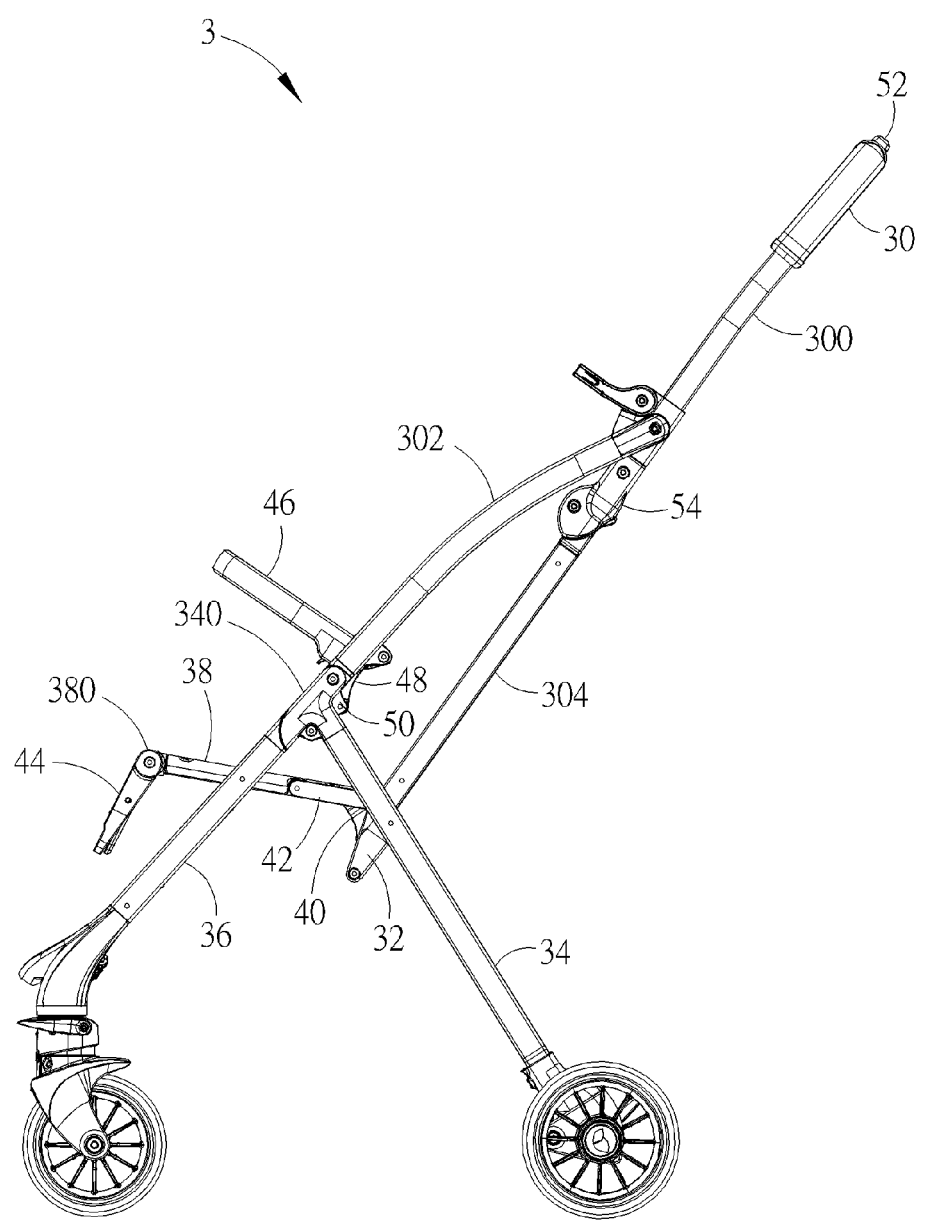
FIG. 4 is a side view illustrating the transportation device shown in FIG. 3.
Figure 5:
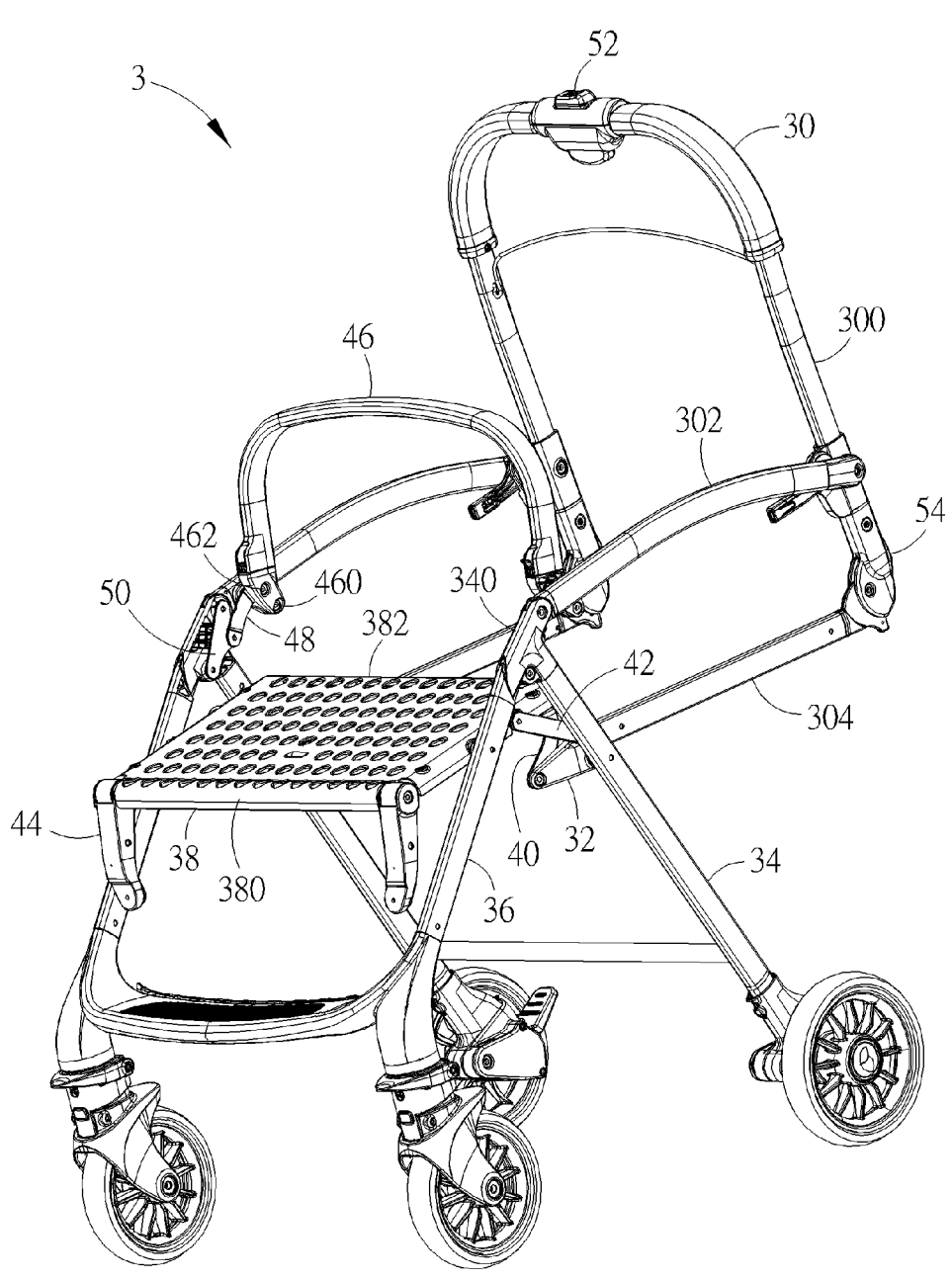
FIG. 5 is a perspective view illustrating the transportation device shown in FIG. 3 in a half folding state.
Figure 6:
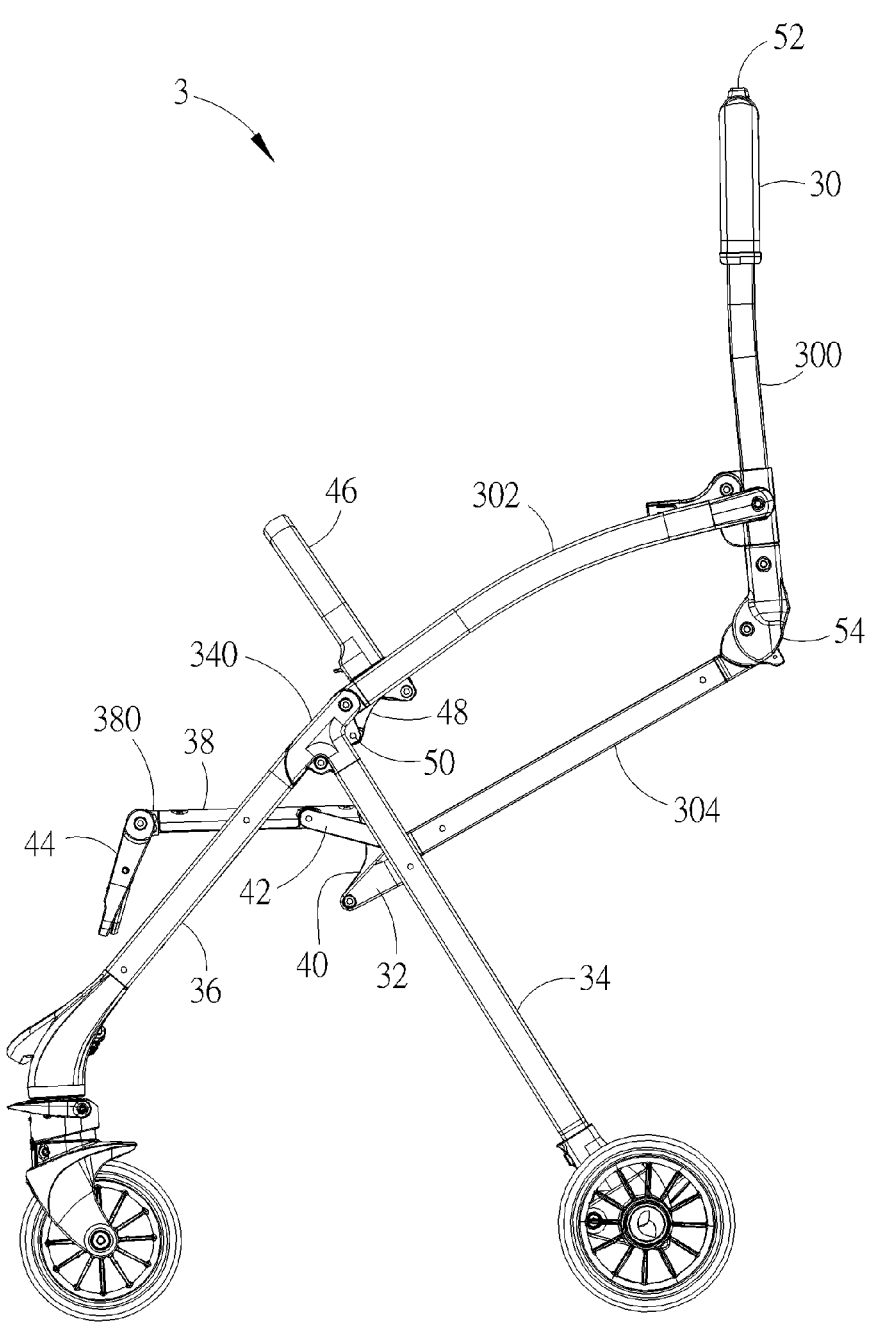
FIG. 6 is a side view illustrating the transportation device shown in FIG. 5.
Figure 7:
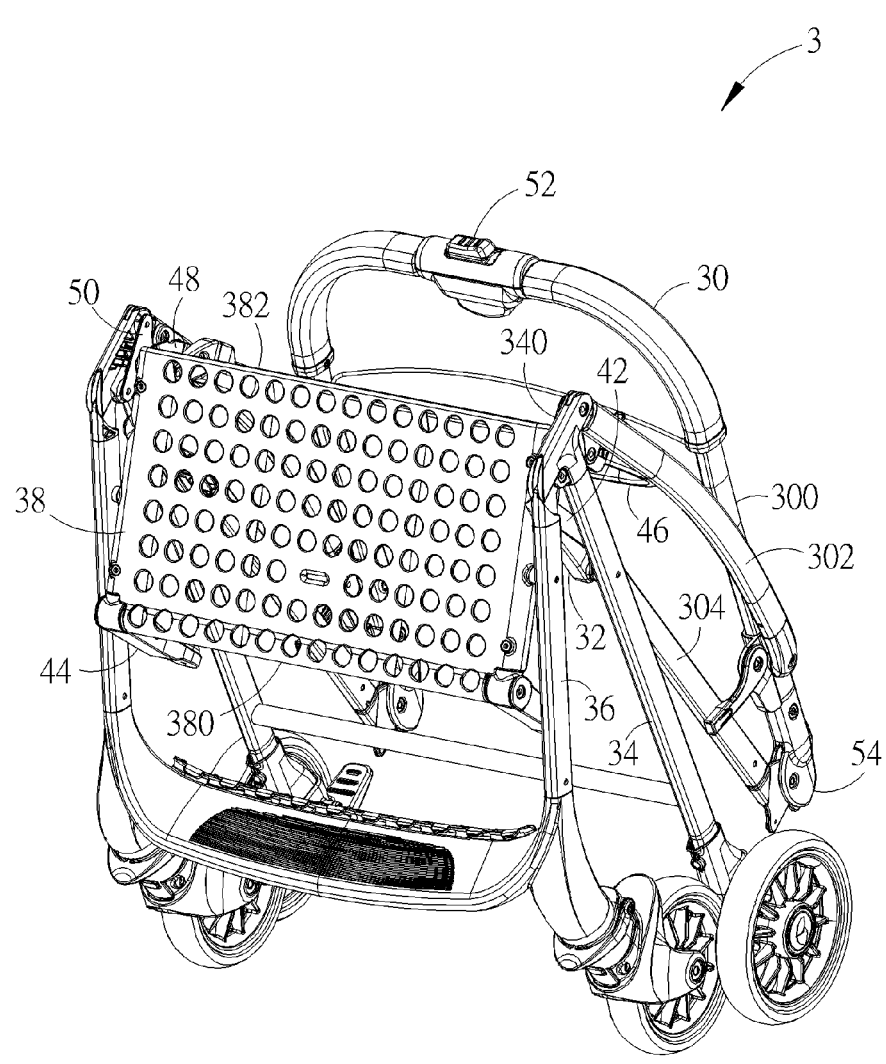
FIG. 7 is a perspective view illustrating the transportation device shown in FIG. 3 being folded.
Figure 8:
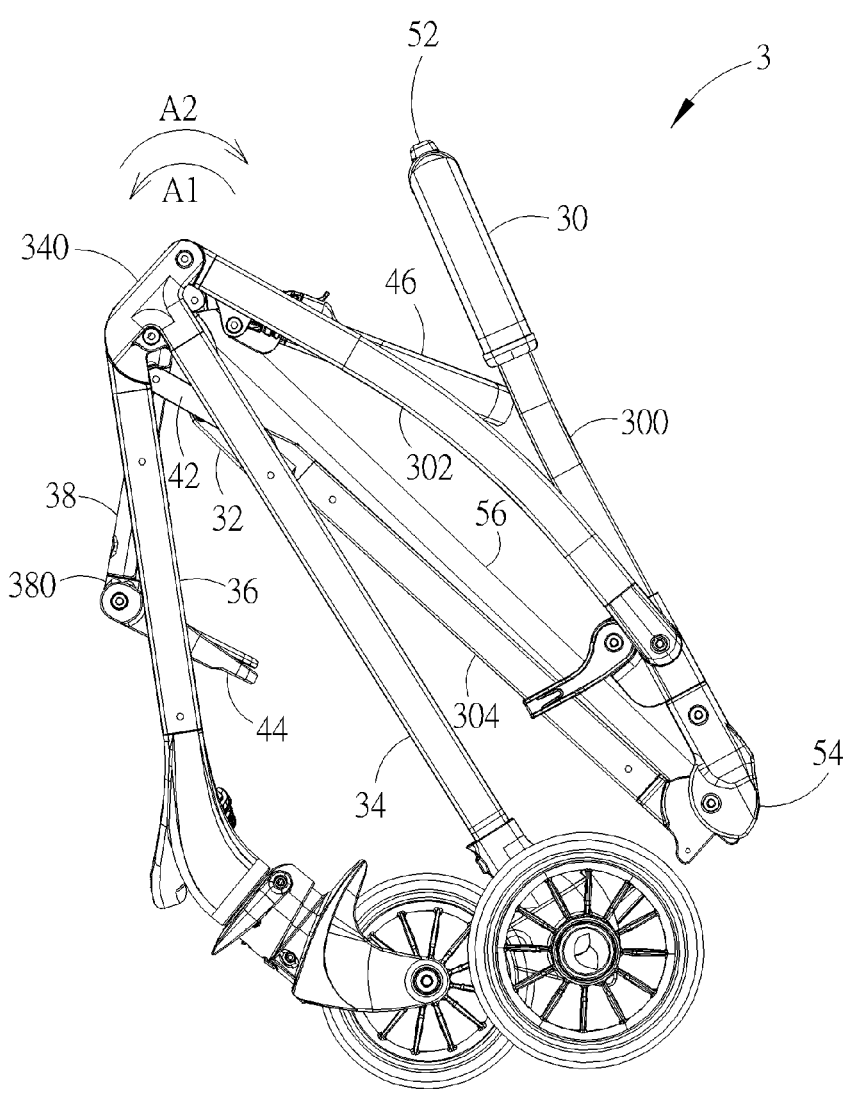
FIG. 8 is a side view illustrating the transportation device shown in FIG. 7.

Referring to FIGS. 3 to 8, FIG. 3 is a perspective view illustrating a transportation device 3 according to an embodiment of the invention, FIG. 4 is a side view illustrating the transportation device 3 shown in FIG. 3, FIG. 5 is a perspective view illustrating the transportation device 3 shown in FIG. 3 in a half folding state, FIG. 6 is a side view illustrating the transportation device 3 shown in FIG. 5, FIG. 7 is a perspective view illustrating the transportation device 3 shown in FIG. 3 being folded, and FIG. 8 is a side view illustrating the transportation device 3 shown in FIG. 7.

As shown in FIGS. 3 to 8, the transportation device 3 of the invention includes a handle 30, a fixing member 32, a rear leg 34, a front leg 36, a seat 38, a first seat linkage member 40, a second seat linkage member 42, a lower leg rest 44, a handrail 46, a first handrail linkage member 48 and a second handrail linkage member 50. The transportation device 3 may be a stroller or other devices used for transportation. It should be noted that the structure of the transportation device 3 of the invention is substantially symmetrical and the technical features of the invention will be described by the structure of one side in the following.

As shown in FIGS. 3 to 8, in this embodiment, the handle 30 may include an upper handle 300, a first lower handle 302 and a second lower handle 304. The first lower handle 302 and the second lower handle 304 are pivotally connected to the upper handle 300, such that the upper handle 300, the first lower handle 302 and the second lower handle 304 can rotate with respect to each other to be folded or unfolded. The transportation device 3 may further include a folding operation member 52 and a lock mechanism 54. The folding operation member 52 may be disposed on the upper handle 300. A user may operate the folding operation member 52 to fold the transportation device 3. The lock mechanism 54 may be disposed at a pivotal joint between the upper handle 300 and the second lower handle 304, wherein the lock mechanism 54 is used to lock or unlock the upper handle 300 and the second lower handle 304.

As shown in FIGS. 3 and 4, the fixing member 32 is disposed at a rear side 382 of the seat 38 and connected to an end of the second lower handle 304 of the handle 30. In this embodiment, the rear leg 34 may include a connecting member 340. The front leg 36 and the first lower handle 302 of the handle 30 are pivotally connected to opposite sides of the connecting member 340 of the rear leg 34, such that the front leg 36 and the first lower handle 302 of the handle 30 can rotate with respect to the rear leg 34 to be folded or unfolded. The seat 38 is pivotally connected to the front leg 36. Opposite ends of the first seat linkage member 40 are pivotally connected to the seat 38 and the fixing member 32. Opposite ends of the second seat linkage member 42 are pivotally connected to the seat 38 and the rear leg 34. In this embodiment, the first seat linkage member 40 and the second seat linkage member 42 may be, but not limited to, iron sheets.

As shown in FIGS. 3, 5 and 7, the seat 38 has a front side 380 and a rear side 382. The lower leg rest 44 is pivotally connected to the front side 380 of the seat 38, such that the lower leg rest 44 can rotate with respect to the seat 38 to adjust an angle between the lower leg rest 44 and the seat 38. Furthermore, the transportation device 3 may further include a backrest 56 (as shown in FIG. 8). In general, the backrest 56 is disposed at the rear side 382 of the seat 38. Thus, the rear side 382 of the seat 38 is a boundary between the seat 38 and the backrest 56. In this embodiment, the handrail 46 may be pivotally connected to the first lower handle 302 of the handle 30 by a pivot 460, such that the handrail 46 can rotate with respect to the first lower handle 302 of the handle 30 to adjust an angle between the handrail 46 and the first lower handle 302. The second handrail linkage member 50 is fixed on the connecting member 340 of the rear leg 34. An end of the first handrail linkage member 48 is pivotally connected to the handrail 46 by a pivot 462, and another end of the first handrail linkage member 48 is pivotally connected to the second handrail linkage member 50. In this embodiment, the first handrail linkage member 48 and the second handrail linkage member 50 may be, but not limited to, iron sheets.

As shown in FIGS. 3 to 8, the handle 30, the rear leg 34 and the front leg 36 can be folded or unfolded with respect to each other to drive the seat 38 and the handrail 46 to be folded or unfolded. For further illustration, when the handle 30, the rear leg 34 and the front leg 36 are folded with respect to each other, the fixing member 32 and the rear leg 34 will drive the seat 38 to be folded or unfolded by the first seat linkage member 40 and the second seat linkage member 42 respectively. As shown in FIGS. 7 and 8, when the handle 30, the rear leg 34 and the front leg 36 are folded with respect to each other, the fixing member 32 and the rear leg 34 will drive the rear side 382 of the seat 38 to rotate toward a direction opposite to the ground (i.e. the direction of an arrow A1) by the first seat linkage member 40 and the second seat linkage member 42 respectively. Accordingly, after the seat 38 is folded, the seat 38 rotates downward in the direction of the arrow A1, such that the front side 380 of the seat 38 is lower than the rear side 382 of the seat 38. As mentioned in the above, the rear side 382 of the seat 38 is the boundary between the seat 38 and the backrest 56. Therefore, in other words, after the seat 38 is folded, the boundary between the seat 38 and the backrest 56 moves to the most top position, such that the backrest 56 will not touch the ground after the transportation device 3 is folded. Thus, the length of the backrest 56 may increase according to practical requirements. Furthermore, when the handle 30, the rear leg 34 and the front leg 36 are unfolded with respect to each other, the fixing member 32 and the rear leg 34 will drive the rear side 382 of the seat 38 to be positioned toward the ground (i.e. the direction of an arrow A2) by the first seat linkage member 40 and the second seat linkage member 42 respectively.

As shown in FIGS. 3 to 8, when the handle 30, the rear leg 34 and the front leg 36 are folded or unfolded with respect to each other, the rear leg 34 will also drive the handrail 46 to be folded or unfolded by the first handrail linkage member 48 and the second handrail linkage member 50. As shown in FIGS. 7 and 8, after the transportation device 3 is folded, the seat 38 rotates downward in the direction of the arrow A1 and the handrail 46 rotates downward in the direction of the arrow A2, so as to reduce the height of the folded transportation device 3. Accordingly, it is beneficial for storing or transporting the transportation device 3.

It should be noted that, in another embodiment, the transportation device 3 may only include the first handrail linkage member 48 without the second handrail linkage member 50. In other words, the second handrail linkage member 50 may be omitted. When the transportation device 3 only includes the first handrail linkage member 48, opposite ends of the first handrail linkage member 48 may be pivotally connected to the handrail 46 and the rear leg 34. Thus, when the handle 30, the rear leg 34 and the front leg 36 are folded or unfolded with respect to each other, the rear leg 34 will drive the handrail 46 to be folded or unfolded by the first handrail linkage member 48.

Figure 9:
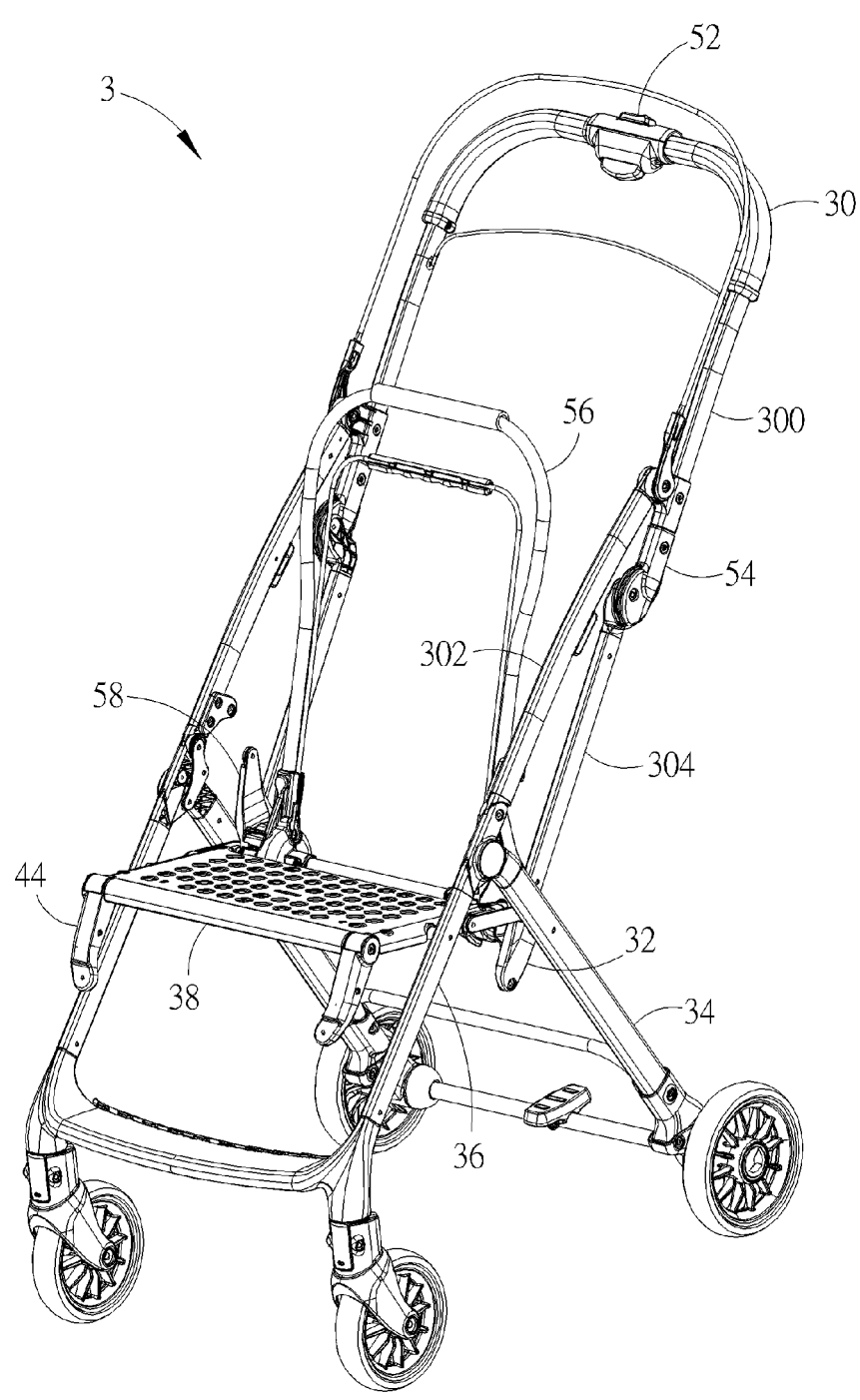
FIG. 9 is a perspective view illustrating the transportation device according to another embodiment of the invention.
Figure 10:
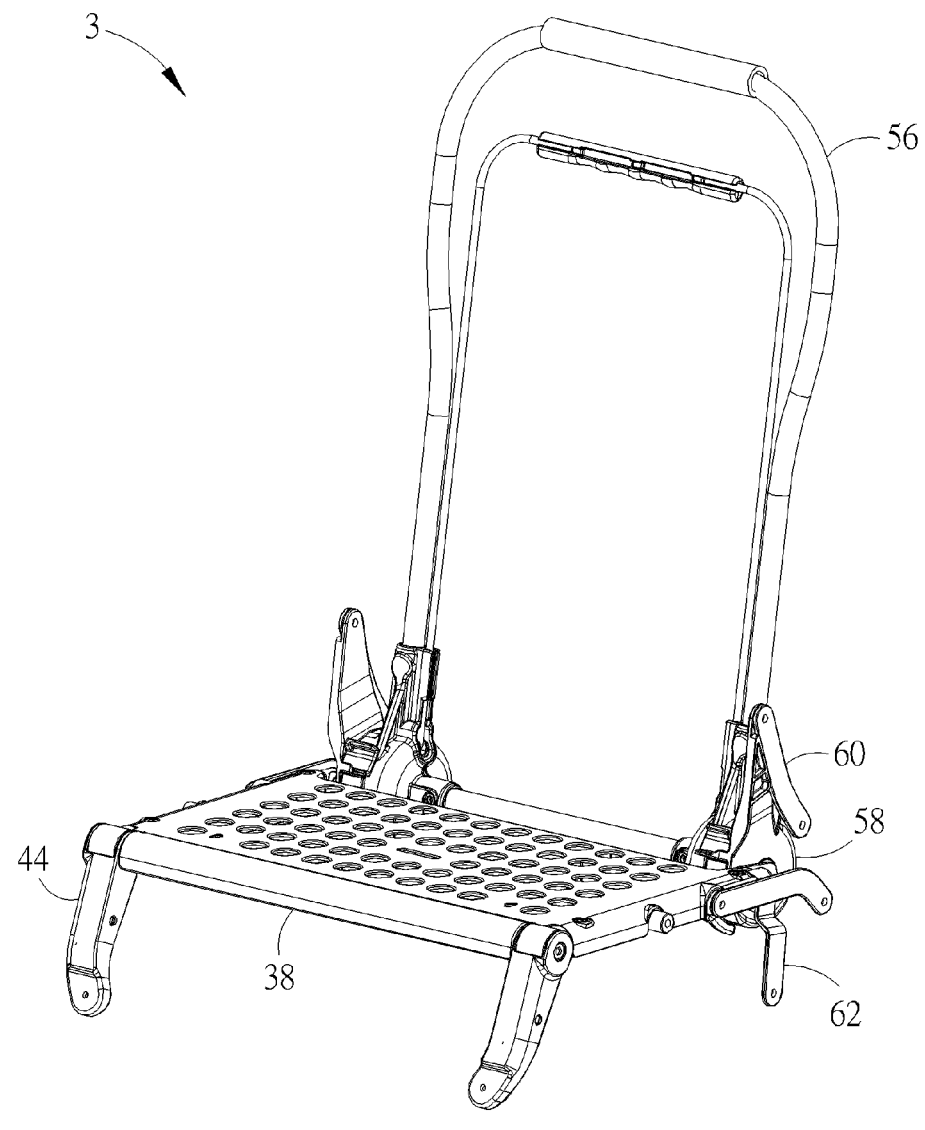
FIG. 10 is a perspective view illustrating the transportation device shown in FIG. 9 without the handle, the rear leg and the front leg.
Figure 11:
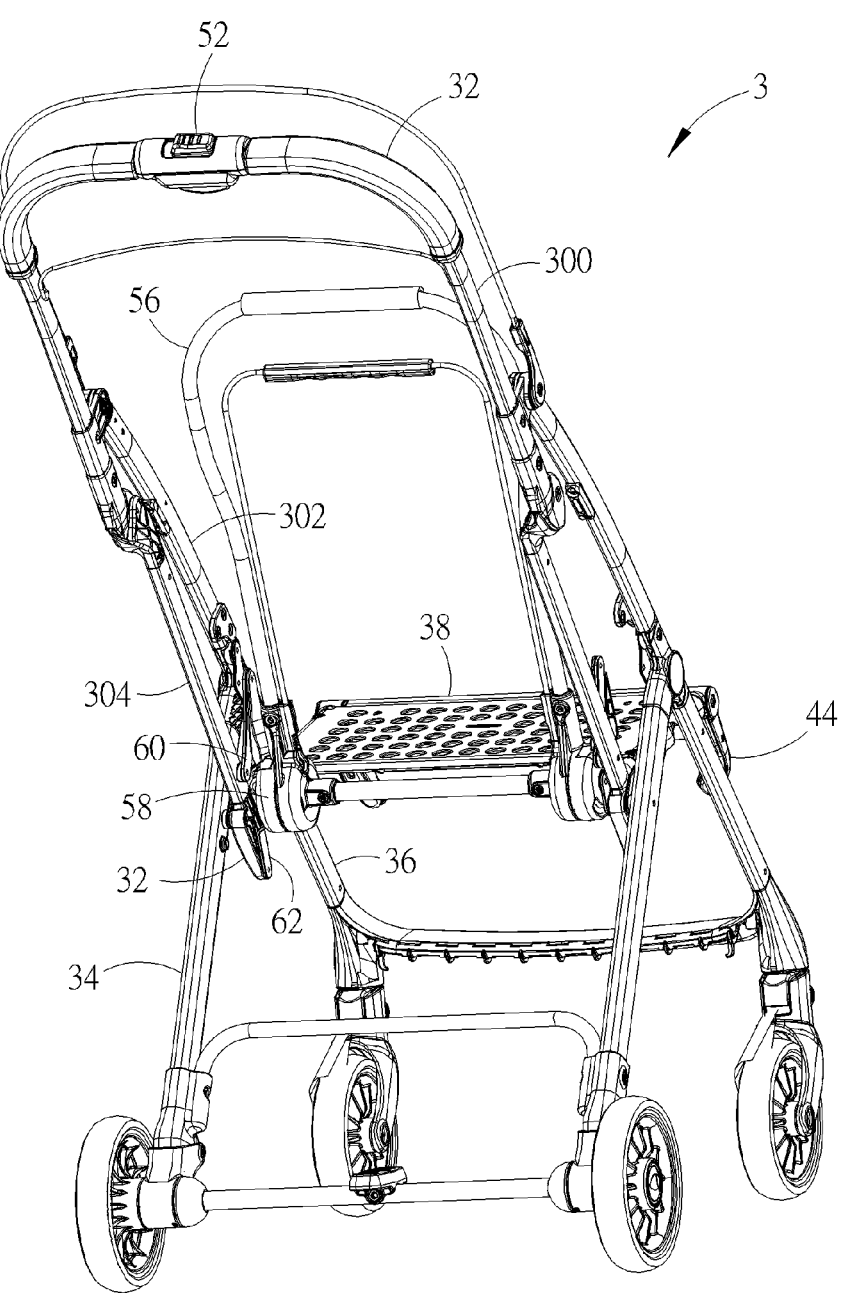
FIG. 11 is a perspective view illustrating the transportation device shown in FIG. 9 from another viewing angle.
Figure 12:
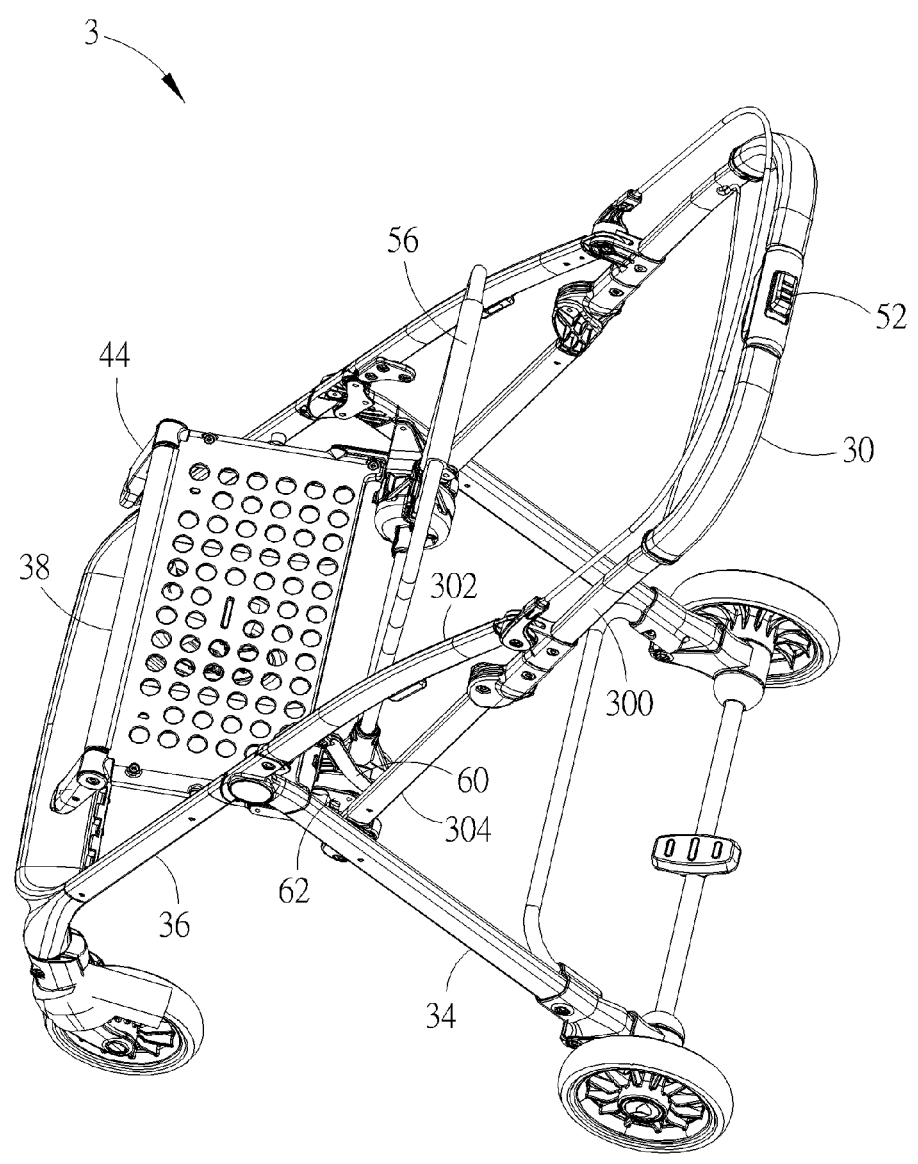
FIG. 12 is a perspective view illustrating the transportation device shown in FIG. 9 from another viewing angle.
Figure 13:
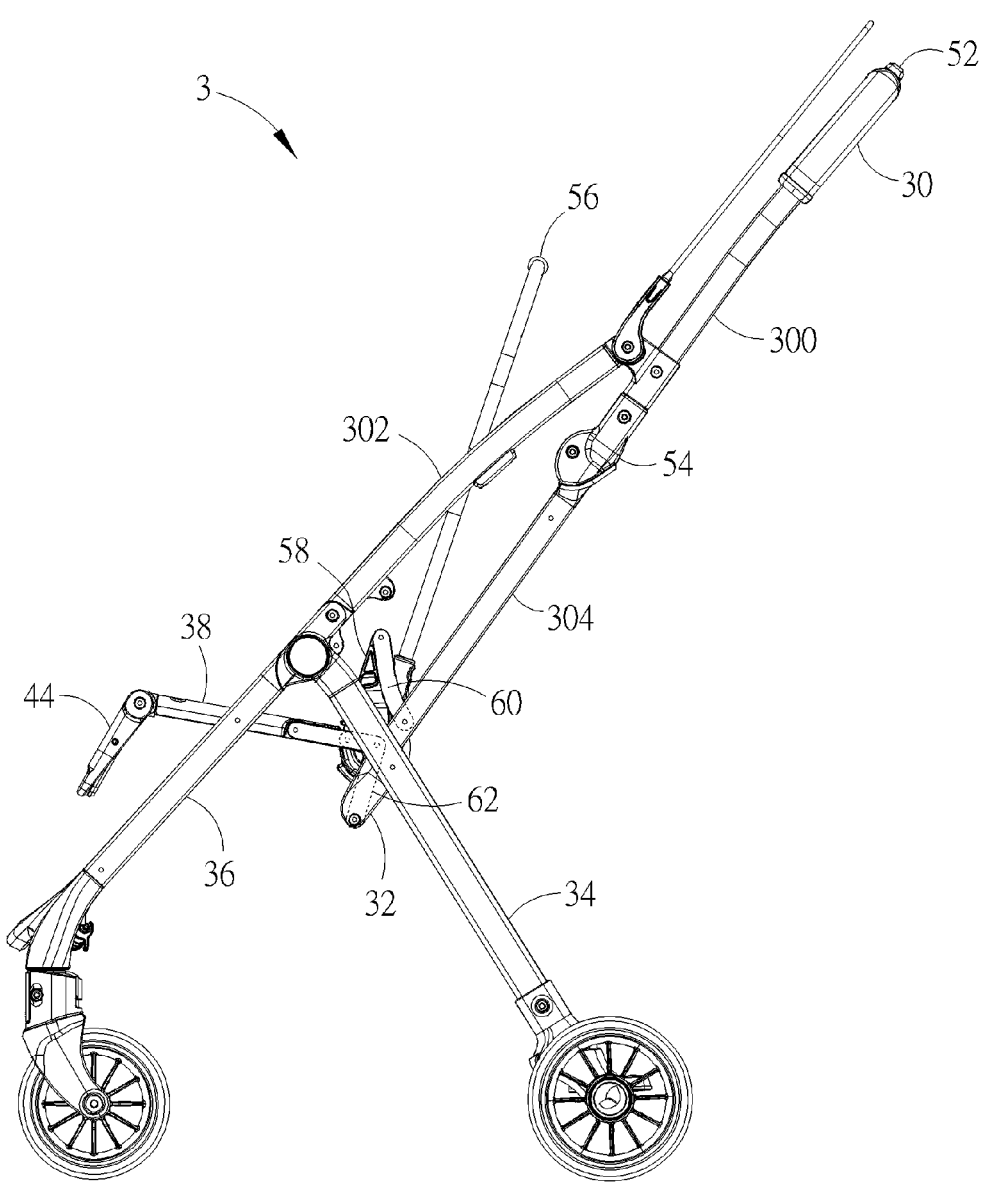
FIG. 13 is a side view illustrating the transportation device shown in FIG. 9.
Figure 14:
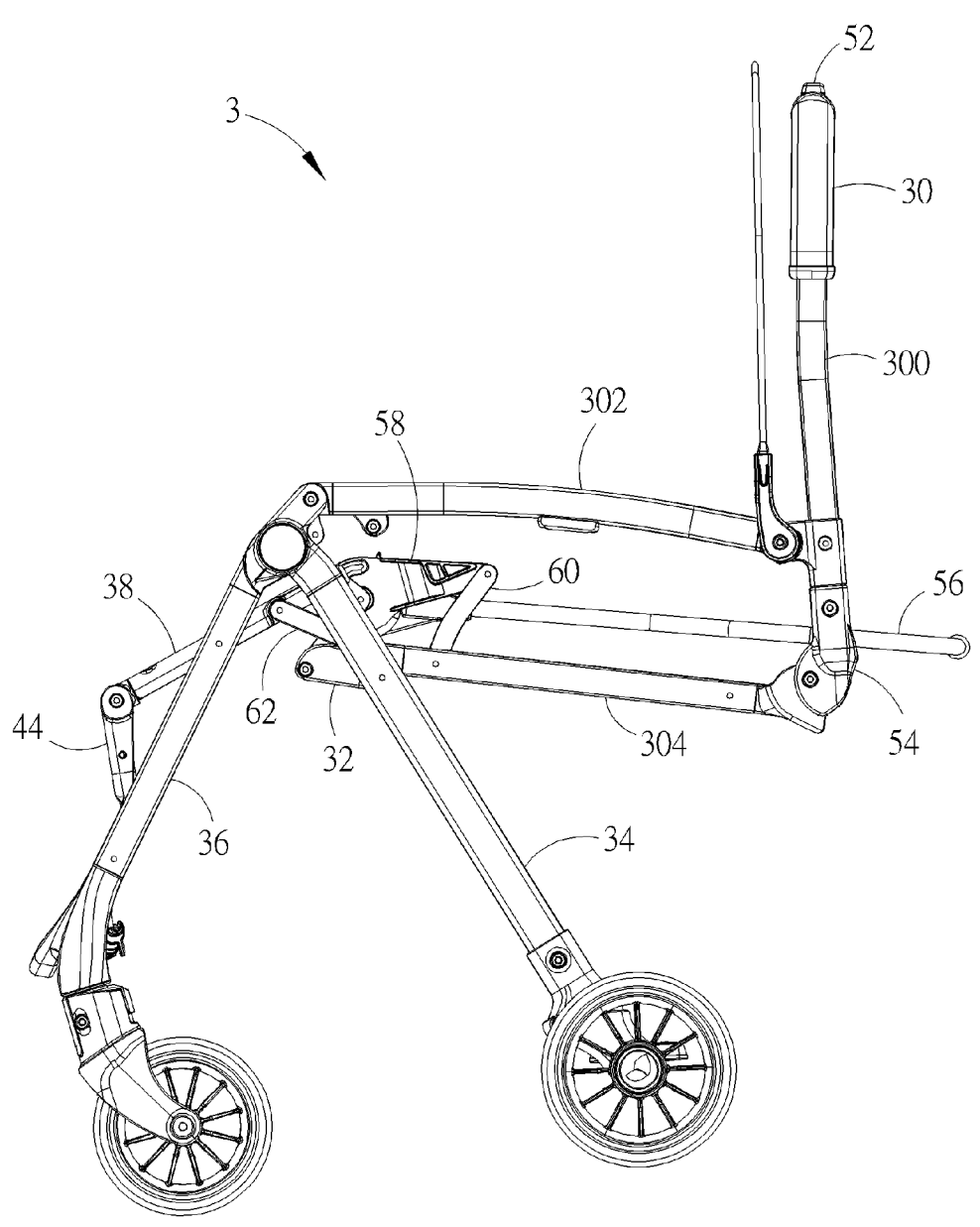
FIG. 14 is a side view illustrating the transportation device shown in FIG. 13 in a half folding state.
Figure 15:
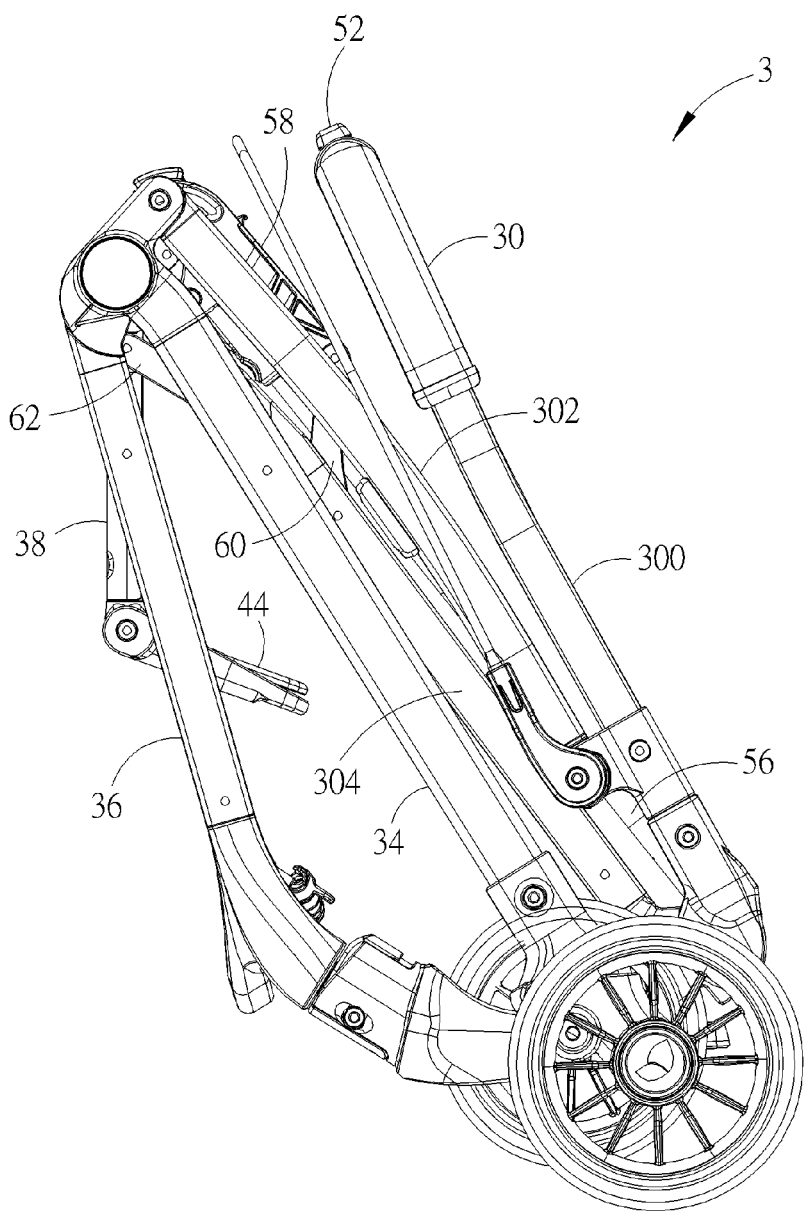
FIG. 15 is a side view illustrating the transportation device shown in FIG. 13 being folded.
Figure 16:
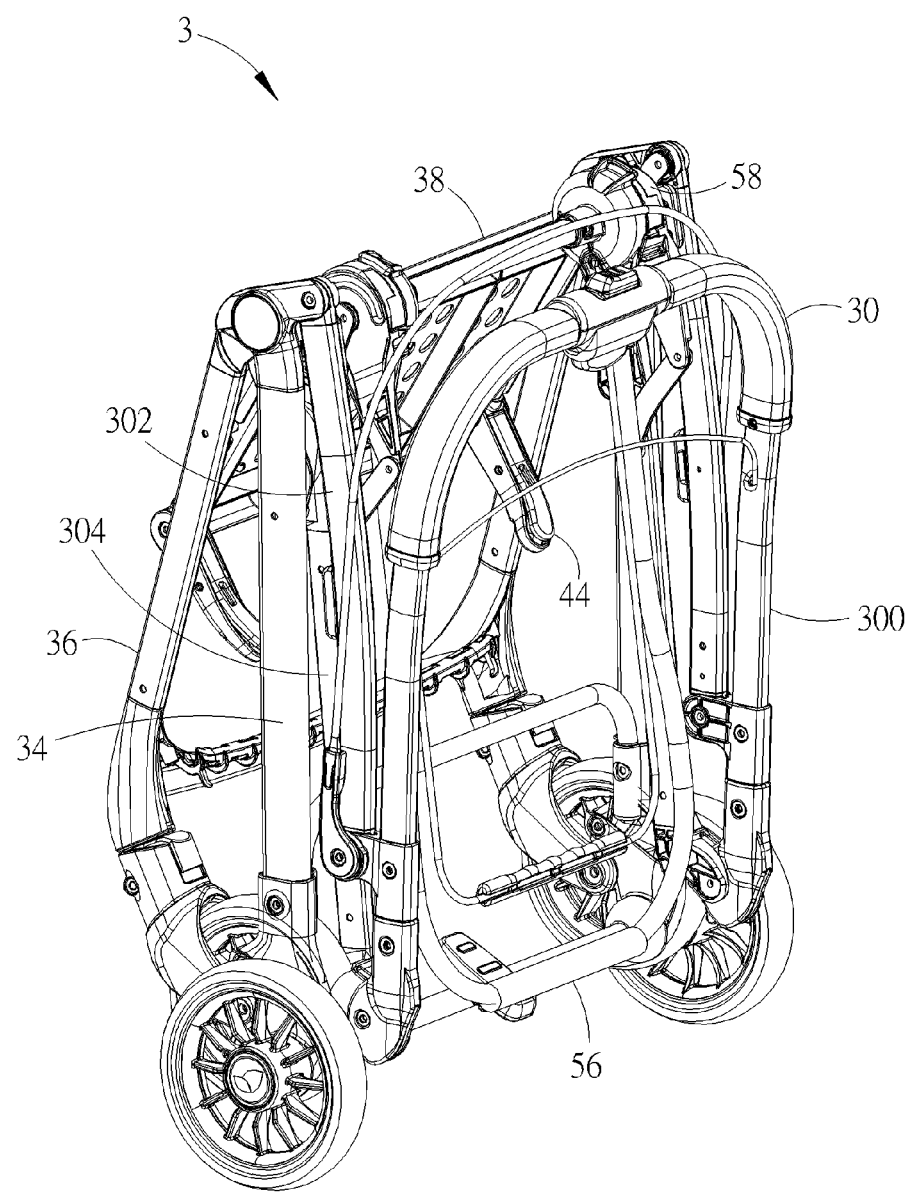
FIG. 16 is a perspective view illustrating the transportation device shown in FIG. 15.

Referring to FIGS. 9 to 16, FIG. 9 is a perspective view illustrating the transportation device 3 according to another embodiment of the invention, FIG. 10 is a perspective view illustrating the transportation device 3 shown in FIG. 9 without the handle 30, the rear leg 34 and the front leg 36, FIG. 11 is a perspective view illustrating the transportation device 3 shown in FIG. 9 from another viewing angle, FIG. 12 is a perspective view illustrating the transportation device 3 shown in FIG. 9 from another viewing angle, FIG. 13 is a side view illustrating the transportation device 3 shown in FIG. 9, FIG. 14 is a side view illustrating the transportation device 3 shown in FIG. 13 in a half folding state, FIG. 15 is a side view illustrating the transportation device 3 shown in FIG. 13 being folded, and FIG. 16 is a perspective view illustrating the transportation device 3 shown in FIG. 15.

As shown in FIGS. 9 to 16, the transportation device 3 may further include a backrest rotating base 58, a first backrest linkage member 60 and a second backrest linkage member 62. The backrest 56 is pivotally connected to the backrest rotating base 58, such that the backrest 56 can rotate with respect to the backrest rotating base 58 to adjust an angle between the backrest 56 and the backrest rotating base 58. As shown in FIGS. 11 and 13, opposite ends of the first backrest linkage member 60 are pivotally connected to the backrest rotating base 58 and the second lower handle 304 of the handle 30. The second backrest linkage member 62 is pivotally connected to the fixing member 32, the seat 38 and the backrest rotating base 58. As shown in FIGS. 11 and 13, a lower end of the second backrest linkage member 62 is pivotally connected to the fixing member 32. As shown in FIGS. 12 and 13, a front side of an upper end of the second backrest linkage member 62 is pivotally connected to the seat 38, and a middle portion of the second backrest linkage member 62 is pivotally connected to the backrest rotating base 58. Accordingly, when the handle 30, the rear leg 34 and the front leg 36 are folded or unfolded with respect to each other, the handle 30 will drive the backrest 56 to be folded or unfolded by the first backrest linkage member 60 and the second backrest linkage member 62. It should be noted that FIGS. 13 to 15 illustrates a folding process when the backrest 56 is in an upright state. When the backrest 56 is in a lying state, the backrest 56 will push against the rear leg 34 during the folding process, such that the backrest 56 will be pushed to the upright position. In this embodiment, the first backrest linkage member 60 and the second backrest linkage member 62 may be, but not limited to, iron sheets.

As mentioned in the above, when the transportation device of the invention is folded, the invention utilizes the first seat linkage member and the second seat linkage member to drive the rear side of the seat to rotate toward a direction opposite to the ground, such that the front side of the seat is lower than the rear side of the seat. In general, the rear side of the seat is the boundary between the seat and the backrest. Therefore, after the transportation device of the invention is folded, the boundary between the seat and the backrest will move to the most top position, such that the backrest will not touch the ground after the transportation device is folded. Thus, the length of the backrest may increase according to practical requirements. Furthermore, after the transportation device of the invention is folded, the seat and the handrail both rotate downward, so as to reduce the height of the folded transportation device. Accordingly, it is beneficial for storing or transporting the transportation device.

The foregoing are only preferred embodiments of the invention while the protection scope thereof is not limited to the above description. Any change or substitution within the technical scope disclosed by the invention should be covered by the protection scope of the invention.

The invention claimed is:

1. A transportation device, comprising:
a handle;
a rear leg;
a front leg pivotally connected to the rear leg;
a seat pivotally connected to the front leg;
a fixing member disposed at a rear side of the seat and connected to an end of the handle;
a first seat linkage member pivotally connected to the seat and the fixing member; and
a second seat linkage member pivotally connected to the seat and the rear leg;
wherein when the handle, the rear leg and the front leg are folded with respect to each other, the fixing member and the rear leg drive the rear side of the seat to rotate toward a direction opposite to ground by the first seat linkage member and the second seat linkage member respectively;
when the handle, the rear leg and the front leg are unfolded with respect to each other, the fixing member and the rear leg drive the rear side of the seat to be positioned toward ground by the first seat linkage member and the second seat linkage member respectively.

2. The transportation device of claim 1, wherein after the seat is folded, a front side of the seat is lower than the rear side of the seat.

3. The transportation device of claim 2, further comprising a lower leg rest pivotally connected to the front side of the seat.

4. The transportation device of claim 1, further comprising a handrail pivotally connected to the handle.

5. The transportation device of claim 4, further comprising a first handrail linkage member and a second handrail linkage member, wherein the first handrail linkage member is pivotally connected to the handrail and the second handrail linkage member, the second handrail linkage member is fixed on the rear leg; wherein, when the handle, the rear leg and the front leg are folded or unfolded with respect to each other, the rear leg drives the handrail to be folded or unfolded by the first handrail linkage member and the second handrail linkage member.

6. The transportation device of claim 4, further comprising a first handrail linkage member, wherein the first handrail linkage member is pivotally connected to the handrail and the rear leg; wherein, when the handle, the rear leg and the front leg are folded or unfolded with respect to each other, the rear leg drives the handrail to be folded or unfolded by the first handrail linkage member.

7. The transportation device of claim 1, further comprising a backrest and a backrest rotating base, wherein the backrest is pivotally connected to the backrest rotating base.

8. The transportation device of claim 7, further comprising a first backrest linkage member and a second backrest linkage member, wherein the first backrest linkage member is pivotally connected to the backrest rotating base and the handle, the second backrest linkage member is pivotally connected to the fixing member, the seat and the backrest rotating base; wherein, when the handle, the rear leg and the front leg are folded or unfolded with respect to each other, the handle drives the backrest to be folded or unfolded by the first backrest linkage member and the second backrest linkage member.

9. The transportation device of claim 1,
wherein the seat is pivotally connected to the handle, the rear leg and the front leg, and
wherein the handle, the rear leg and the front leg are folded or unfolded with respect to each other to drive the seat to be folded or unfolded; after the seat is folded, a front side of the seat is lower than a rear side of the seat.

10. The transportation device of claim 9, further comprising a lower leg rest pivotally connected to the front side of the seat.

11. The transportation device of claim 9, further comprising a handrail pivotally connected to the handle.

12. The transportation device of claim 11, further comprising a first handrail linkage member and a second handrail linkage member,
wherein the first handrail linkage member is pivotally connected to the handrail and the second handrail linkage member, the second handrail linkage member is fixed on the rear leg; wherein, when the handle, the rear leg and the front leg are folded or unfolded with respect to each other, the rear leg drives the handrail to be folded or unfolded by the first handrail linkage member and the second handrail linkage member.

13. The transportation device of claim 11, further comprising a first handrail linkage member,
wherein the first handrail linkage member is pivotally connected to the handrail and the rear leg, wherein, when the handle, the rear leg and the front leg are folded or unfolded with respect to each other, the rear leg drives the handrail to be folded or unfolded by the first handrail linkage member.

14. The transportation device of claim 9, further comprising a backrest and a backrest rotating base, wherein the backrest is pivotally connected to the backrest rotating base.

15. The transportation device of claim 14, further comprising a first backrest linkage member and a second backrest linkage member,
wherein the first backrest linkage member is pivotally connected to the backrest rotating base and the handle, the second backrest linkage member is pivotally connected to the fixing member, the seat and the backrest rotating base;

wherein, when the handle, the rear leg and the front leg are folded or unfolded with respect to each other, the handle drives the backrest to be folded or unfolded by the first backrest linkage member and the second backrest linkage member.

16. A transportation device, comprising:

a handle;

a rear leg;

a front leg pivotally connected to the rear leg; and a seat pivotally connected to the handle, the rear leg and the front leg;

wherein the handle, the rear leg and the front leg are folded or unfolded with respect to each other to drive the seat to be folded or unfolded; after the seat is folded, a front side of the seat is lower than a rear side of the seat;

wherein the transportation device further comprises:

a handrail pivotally connected to the handle; and a first handrail linkage member;

wherein the first handrail linkage member is pivotally connected to the handrail and the rear leg, wherein, when the handle, the rear leg and the front leg are folded or unfolded with respect to each other, the rear leg drives the handrail to be folded or unfolded by the first handrail linkage member.

17. The transportation device of claim 16, further comprising a second handrail linkage member, wherein the first handrail linkage member is pivotally connected to the handrail and the second handrail linkage member, the second handrail linkage member is fixed on the rear leg; wherein, when the handle, the rear leg and the front leg are folded or unfolded with respect to each other, the rear leg drives the handrail to be folded or unfolded by the first handrail linkage member and the second handrail linkage member.

18. A transportation device, comprising:

a handle;

a rear leg;

a front leg pivotally connected to the rear leg; and a seat pivotally connected to the handle, the rear leg and the front leg;

wherein the handle, the rear leg and the front leg are folded or unfolded with respect to each other to drive the seat to be folded or unfolded; after the seat is folded, a front side of the seat is lower than a rear side of the seat;

wherein the transportation device further comprises:

a fixing member disposed at a rear side of the seat and connected to an end of the handle;

a backrest;

a backrest rotating base, wherein the backrest is pivotally connected to the backrest rotating base;

a first backrest linkage member; and a second backrest linkage member, wherein the first backrest linkage member is pivotally connected to the backrest rotating base and the handle, the second backrest linkage member is pivotally connected to the fixing member, the seat and the backrest rotating base;

wherein, when the handle, the rear leg and the front leg are folded or unfolded with respect to each other, the handle drives the backrest to be folded or unfolded by the first backrest linkage member and the second backrest linkage member.

* * * * *